Sept. 15, 1936.  C. MARTIN  2,054,728
APPARATUS FOR THE TRANSPORTATION OF PERISHABLE PRODUCTS
Original Filed May 6, 1929  3 Sheets-Sheet 1
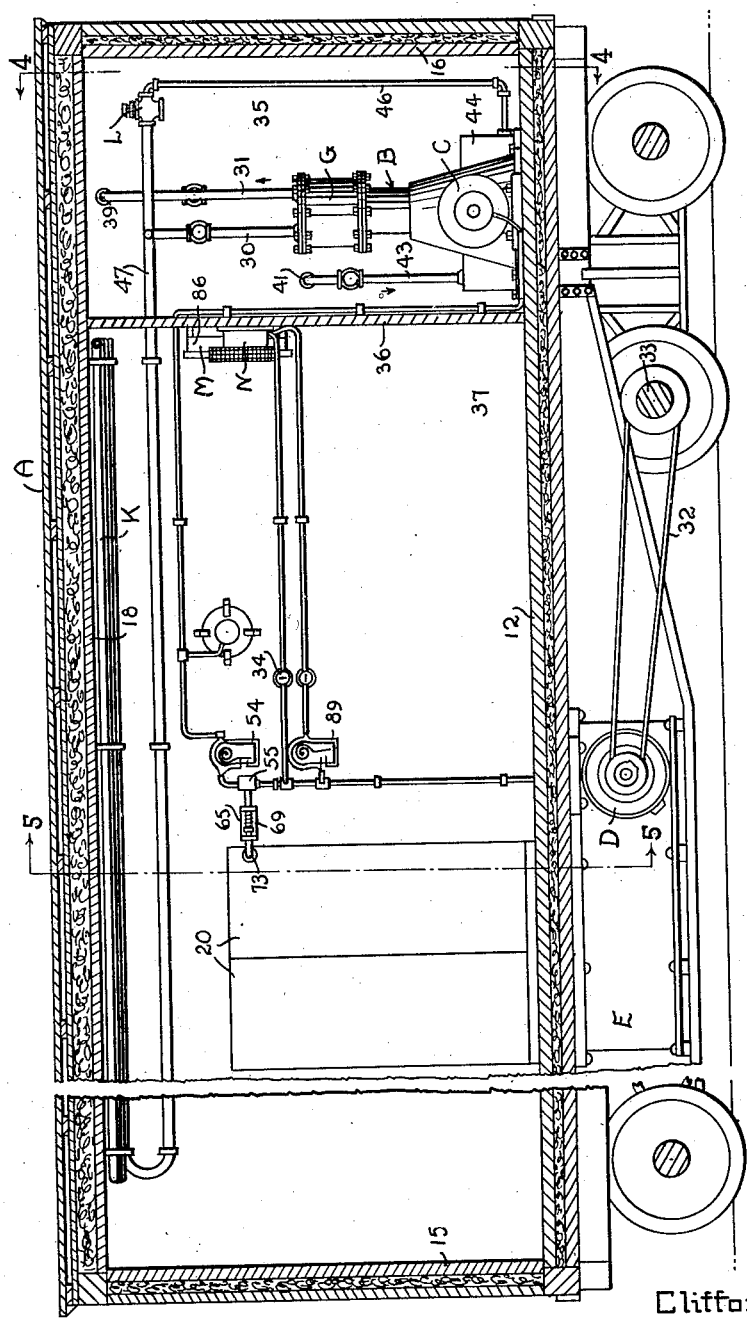
INVENTOR.
Clifford Martin
BY Lancaster, Allwine and Rommel
ATTORNEYS.

Sept. 15, 1936.　　　　C. MARTIN　　　　2,054,728
APPARATUS FOR THE TRANSPORTATION OF PERISHABLE PRODUCTS
Original Filed May 6, 1929　　　3 Sheets-Sheet 2
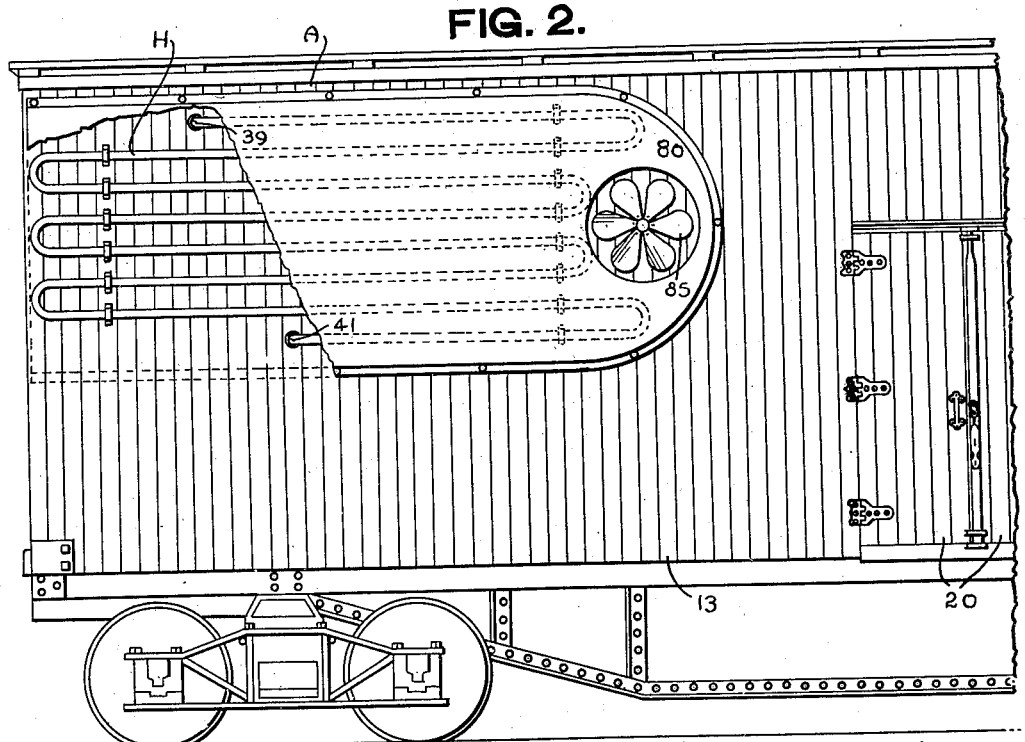
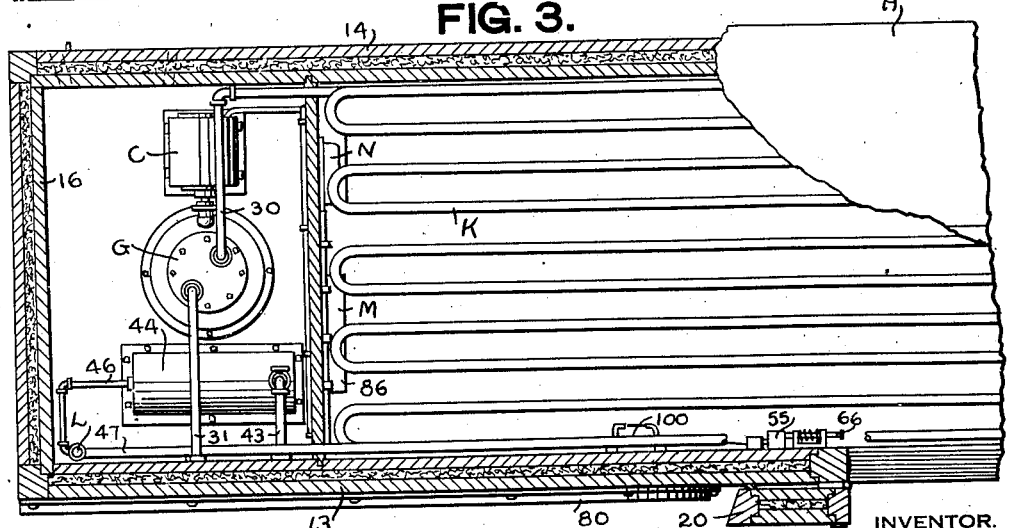
INVENTOR.
Clifford Martin
BY
Lancaster, Allwine & Rommel
ATTORNEYS.

Sept. 15, 1936.　　　　C. MARTIN　　　　2,054,728
APPARATUS FOR THE TRANSPORTATION OF PERISHABLE PRODUCTS
Original Filed May 6, 1929　　　3 Sheets-Sheet 3

INVENTOR.
Clifford Martin
BY
Lancaster, Allwine and Rommel
ATTORNEYS.

Patented Sept. 15, 1936

2,054,728

UNITED STATES PATENT OFFICE 2,054,728

APPARATUS FOR THE TRANSPORTATION OF PERISHABLE PRODUCTS

Clifford Martin, Interlachen, Fla.

Original application May 6, 1929, Serial No. 360,950. Divided and this application January 13, 1933, Serial No. 651,590

3 Claims. (Cl. 257—7)

This invention relates to improvements in refrigerator cars and similar vehicles for the transportation of perishable products, and more particularly to equipment for heat exchange in such vehicles. It is a division of co-pending United States application, Serial Number 360,950, filed May 6, 1929, which matured into Patent No. 1,898,843, dated February 21, 1933.

The primary object of the invention is to provide improved equipment for maintaining a desired temperature in a vehicle of this kind, irrespective of the temperature outside the vehicle.

Another object is to provide improved equipment of this nature, so located with respect to the interior of the vehicle, as to insure the effective maintenance of a desired temperature within the same.

Another object is to provide improved equipment for quickly restoring a desired temperature in a refrigerator car or similar vehicle after the closure of the vehicle has been opened, as when shipments are being discharged, and again closed, in order to protect other shipments within the vehicle.

Another object is to provide equipment which may be utilized for drying the air within a vehicle of this kind and for quickly and effectively defrosting the refrigerating coils of the refrigerating unit.

Still another object is to provide novel equipment for lowering the temperature in a refrigerator car or the like and for raising the temperature in the event air below the desired temperature enters the car through the open doorway, cracks, or other openings.

Another object is to provide novel equipment for heating or cooling the interior of a vehicle adapted to transport perishable products, the equipment including means to provide a relatively even distribution of the cool or warm air.

Other objects and advantages of this invention will be apparent during the course of the following detailed description.

In the accompanying drawings, forming a part of this specification, and wherein similar reference characters designate corresponding parts throughout the several views, Figure 1 is a longitudinal sectional view through the improved refrigerating car.

Figure 2 is a fragmentary side elevation of an end of the car, showing more particularly a condensing coil of the refrigerating equipment therefor.

Figure 3 is a fragmentary sectional view taken through a portion of the improved car beneath the roof thereof.

Figure 4:
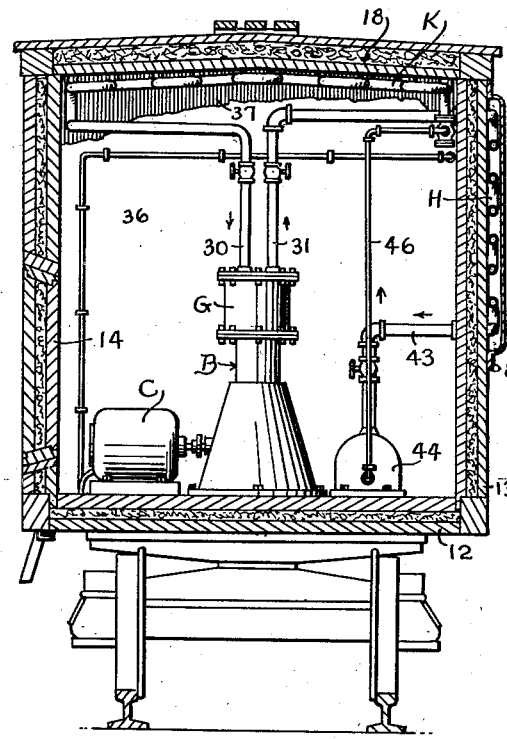
Figures 4 and 5 are sectional views taken substantially on their respective lines in Figure 1.

In the drawings, wherein for the purpose of illustration is shown only a preferred embodiment of the invention, the letter A designates generally a refrigerator car adapted to transport perishable products from place to place. Within the car is disposed refrigerating equipment B operated by a prime mover C which preferably secures its current from a generator D or a storage battery E. The refrigerating apparatus B includes a compressor G, condensing means H, refrigerating coil K and an expansion valve L for expanding a refrigerant into the coil K. Included in the equipment is also a heating unit M and means N for the rapid circulation of air within the car.

The refrigerator car A is of ordinary construction including an insulated floor 12, insulated side walls 13 and 14, insulated end walls 15 and 16 and an insulated roof 18, of any approved construction. In either or both of the side walls 13 and 14 are disposed closures 20, of any approved construction.

The prime mover C may be an electric motor operatively connected to the compressor G to take the refrigerating medium from the inlet line 30 at the low pressure side thereof, and compress the same therein, sending it through a line 31 into the condenser H.

In the preferred construction, the generator D is driven during the travel of the car A, by means of a belt 32 trained about a rotatable axle portion 33 of the truck of the car A. This generator D is connected with the storage battery E for charging the latter if there is excessive current over that required to operate the motor C, as during inoperative periods of the latter, a conventional automatic cut out switch being interposed in the line between the battery and the generator.

The condenser H preferably comprises a coil, zig-zagging in a vertical plane upon the exterior of the wall 13 of the car A, the compresser D, however, being within the car, and it is preferred to place the same as well as other portions of the refrigerating equipment in a special compartment 35 provided within the car, and partitioned at 36 from the compartment 37 wherein the perishable products are transported. The high pressure line 31, of course, is mainly within the car and extends through a suitable opening 39 to exteriorly of the car, where it is connected to the condenser H and at its other end within the car, is connected with the compressor G. The lower end of the coil forming the condenser H is let into the compartment 35 through an opening 41 in the side wall 13 of the car, as shown in Figure 2, and connects with a conduit 43 upon the inner surface of the wall 13 of the car, which conduit extends downwardly into the reservoir 44 wherein the refrigerating medium is receivable. This reservoir 44 is preferably located upon the floor 12 of the car and it has an outlet conduit 46 through which the highly compressed refrigerating medium after being cooled in the condenser H and received in the reservoir 44 is expanded through the expansion valve L into a horizontal length of tubing 47 shown in Figure 3 and disposed along the car close to a side wall and beneath the roof, through which the cooled refrigerating medium flows into the zig-zag convolutions of the refrigerating coil K, which is preferably supported immediately below the roof 18. This refrigerating coil preferably extends the length of the compartment 37 and has an outlet connection into the conduit 30 through which the refrigerating medium flows into the low pressure side of the compressor G for a repetition of the cycle above described.

Figure 6:
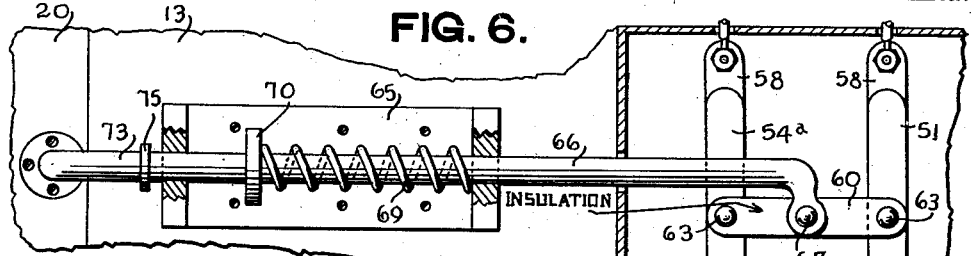
Figure 6 is an enlarged fragmentary view of a closure-operated switch mechanism for controlling the operator of the refrigerating apparatus.
Figure 7:
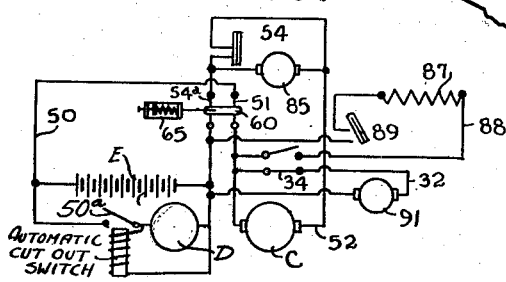
Figure 7 is a diagrammatic wiring system included in the apparatus.

Referring to the automatic control of the refrigerating equipment, as shown in Figure 7, a line 50 extends from the generator D to the motor C, and in this line a switch arm 51 is provided. From the motor C a line 52 extends, at its other terminal, to the battery E and generator D and in this line 52 is disposed a thermostat switch 54 opening and closing the line 52 for cutting out the motor C in the circuit upon the attainment of a desired low temperature within the car. Interposed, in the line 50 between the generator D and battery E, is a conventional automatic cut out switch 50ª, positioned so as to prevent unnecessary drainage of current from the battery. In the line 52 is also disposed a switch arm 54ª. The switch arms 51 and 54ª are more particularly detailed in Figure 6, showing them disposed within in a suitable switch box 55, wherein they are each pivoted at 56 to contact 57, the switch arms 51 and 54ª being swingable at their opposite ends to engagement with contact 58. A bridge piece or link 60 is pivoted at 63 at each end thereof to the switch arms 51 and 54ª, for simultaneously opening and closing the switch.

Upon the inside surface of the wall 13 there is disposed a supporting bracket 65 slidably supporting a rod 66 which is pivotally connected at 67 at one end thereof, between the connections 63 of the link 60. A spring 69, normally under compression, engages the bracket 65 at one end, and receives the rod 65 therethrough, and at its opposite end engages an annular flange 70 on said rod, normally tending to force the rod 66 into such position that the switch arms 51 and 54ª will be thrown out of engagement with their respective terminals for breaking the circuit to the motor C. The closure 20 of the car A is hinged and as shown in Figure 6 may be provided with an L-shaped extension 73, rigid therewith, which, upon closing of the door, moves into engagement with the free end 75 of the plunger 66 causing it to move against the spring compressor 69, into the position shown in Figure 6, for closing the switch arms 51 and 54ª. Upon the opening of the door 20 the extension 73 will be moved out of the path of the plunger 66, permitting the spring 69 to open the switch arms 51 and 54ª, in a manner which is now obvious.

A shield or housing 80 is provided for guarding and controlling the flow of air over the condensing coil H, this being described in detail in the above mentioned U. S. Patent No. 1,898,843.

Associated with this shield or housing 80 is an electric fan 85 and is connected in the electric circuit with the generator D and storage battery E and adapted to be cut out of operation upon opening of either the switch 54ª or the thermostatic switch 54.

Figure 5:
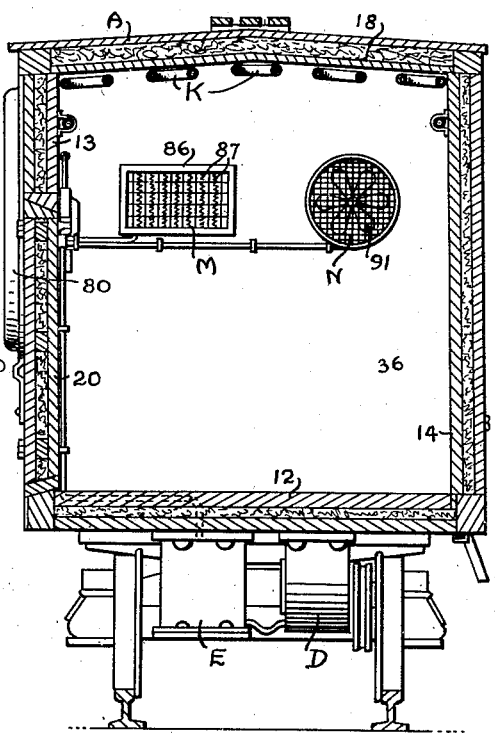

As for the heating unit M, it includes an open mouthed housing 86, housing a plurality of resistance coils 87 adapted to radiate heat into the compartment 37. These coils are operatively connected to the generator D and battery E through a circuit 88. Interposed in the circuit is a thermostatic switch 89 adapted to make or break the current when the temperature drops below or rises above a predetermined degree. It will be noted, particularly in Figure 5, that the heating unit M is disposed wholly below the refrigerating coil K, and in fact, quite remote from the coil. It is preferred to provide a rather elongate housing 86 and dispose the same so that its longitudinal axis is substantially horizontal and in a plane crosswise the longitudinal axes of the coils K. It may be seen from Figure 5 that the heating unit is also disposed remote from the condenser coils under the shield 80.

The air circulating means N preferably includes an electric fan 91 operatively connected to the sources of electrical energy thru a circuit 32 wherein a manually operated switch 34 may be provided. From Figure 5 it will be noted that it is preferred to place the axis of rotation of the fan so that it will substantially intersect a prolongation of the longitudinal axis of the heating unit. It has been found highly satisfactory to place the units M and N adjacent each other and preferably mounted upon the partition 36 and by this juxtaposition of the units M and N and their axial relationship, the circulation of heated air will not only be even but the coils may be evenly and quickly defrosted thruout their length.

In operation, the thermostatic switch 54 is set to break the electric circuit to the motor C when the temperature within the compartment 37 reaches a determined low, and to throw the motor C into operation when the temperature rises above that determined temperature. Likewise, when the door 20 is opened, the circuit will be broken by the door operated switch 51. Since the vehicle may be traveling over a territory where there may be encountered extremes of temperature, cold air seeping into the compartment 37 or air entering the compartment 37 through the opening of the doors 20, may lower the temperature in the compartment 37 to an undesirable degree. In that event, the thermostatic switch 89, which has been properly set, will place the resistance coils 87 in circuit with the generator D or battery E and the heat radiated by the coils will restore the desired temperature to the compartment 37 whereupon the thermostatic switch 89 will break the current to the resistance coils. The relationship of the resistances of the motor C, motor 85 and heating unit M is such that when the thermostat 89 is closed, calling for heat at the heating unit M, the electrical current seeking the path of least resistance will flow thru the resistance 87 of the heating unit M and there will not be sufficient current to operate the motors 85 and C, so that the motor 85 will not always be in operation when the closure 20 is closed. Experience has shown it to be undesirable to place the heating unit M close to the coils K and in any event, not adjacent the vehicle roof. By placing the fan 91 in the position shown in Figure 5, with the heating unit M, a circulation of warm air will take place throughout the compartment 37 or the fan 91 may be operated independently of the heating unit M, as is apparent.

By placing the units M and N upon the partition wall 36, the entire under surface of the roof 18 of the vehicle may be utilized by the coils K and by placing the heating unit M some distance below the roof of the car, the heated air, which naturally rises, will have some distance to travel before it reaches the roof of the vehicle and thus insures a more equitable distribution of temperature throughout the compartment 37.

Various changes may be made to the form of invention herein shown and described, without departing from the spirit of the invention or the scope of the claims.

What is claimed is:

1. In apparatus for the transportation of perishable products, a vehicle body defining a compartment, said body having an opening into said compartment and a movable closure for the opening, a source of electrical energy, a refrigerating unit, a motor for operating said unit, switch means operatively connected between said source of electrical energy and said motor, automatically operated upon the closing and opening of said closure for energizing and deenergizing said motor, an electrical heating unit within said compartment operatively connected to said source of electrical energy, and thermostatic means for controlling said electrical heating unit, operatively connected between said source of electrical energy and said heating unit, whereby said heating unit is operable independently of said refrigerating unit but its thermostatic means is influenced by changes in temperature brought about by the opening of said closure, coupled to changes in temperature brought about by the operation of said refrigerating unit.

2. In apparatus for the transportation of perishable products, a vehicle body defining a compartment, said body having an opening into said compartment and a movable closure for the opening, a source of electrical energy, a refrigerating unit including a condenser exteriorly of said body, a motor for operating said unit, switch means operatively connected between said source of electrical energy and said motor and to said closure, said switch means operated upon the closing and opening of said closure for energizing and deenergizing said motor, a heating unit within said compartment and remote from said condenser and switch means to place said heating unit in operation to heat said compartment.

3. In apparatus for the transportation of perishable products, a vehicle body defining a compartment normally closed to and insulated from the outer atmosphere, said body having an opening into said compartment and a movable closure for the opening, a source of electrical energy, refrigerating means for lowering the temperature of the air within said compartment, an electric motor for operating said means, thermostatic switch means in circuit between said source of electrical energy and said motor for energizing and deenergizing said motor upon closing and opening said closure, an electrical heating unit within said compartment for raising the temperature of the air therein, said heating unit being operatively connected to said source of electrical energy, thermostatic means for controlling said electrical heating unit, and means for agitating the air within said compartment including an electric fan operatively connected to said source of electric energy and within said compartment.

CLIFFORD MARTIN.